July 15, 1969     H. P. GLASS     3,455,291
FIREPLACE HAVING ADJUSTABLE FOOD RECEPTACLE AND ASH RECEPTACLE
Filed May 10, 1967     2 Sheets-Sheet 1
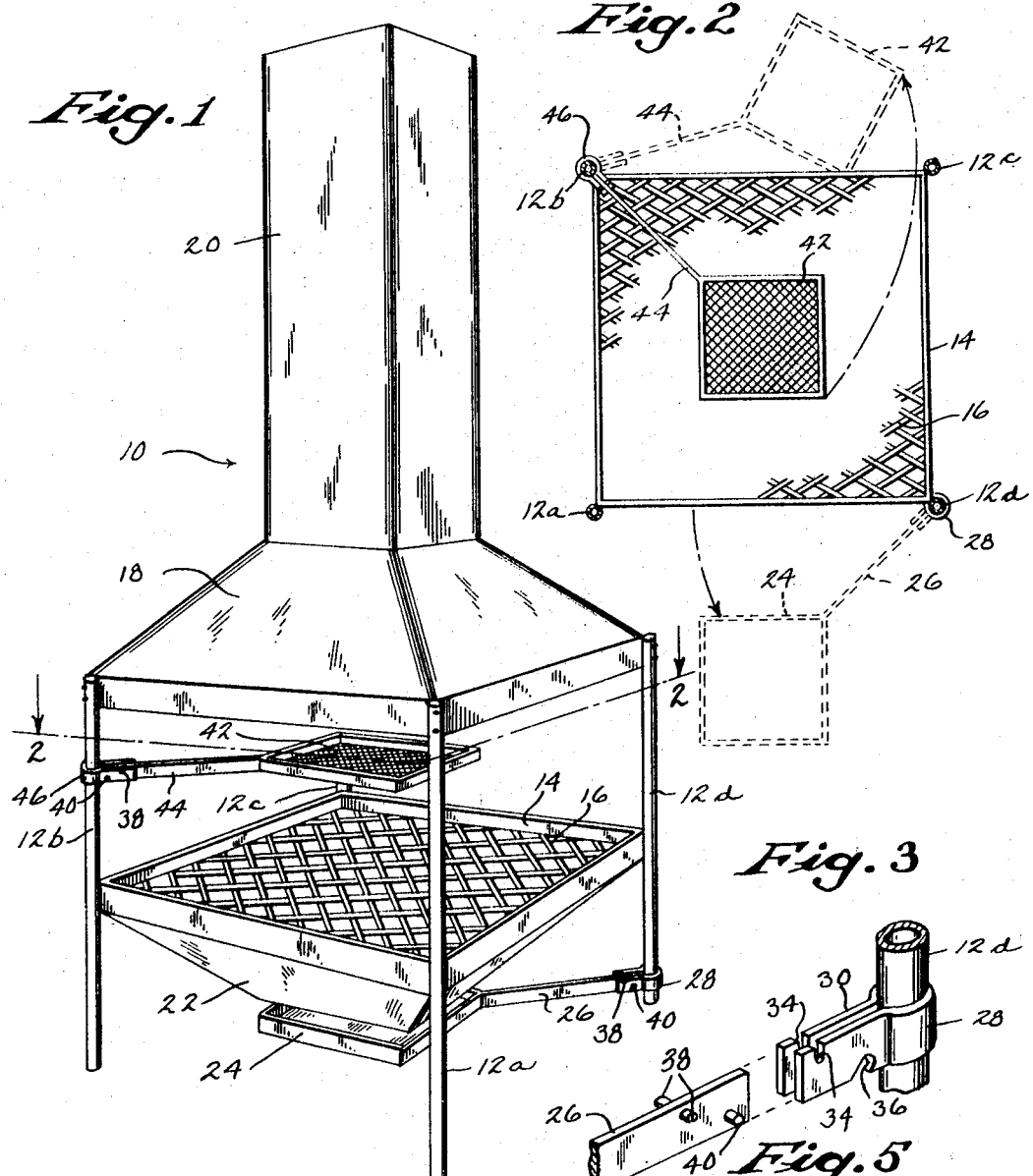
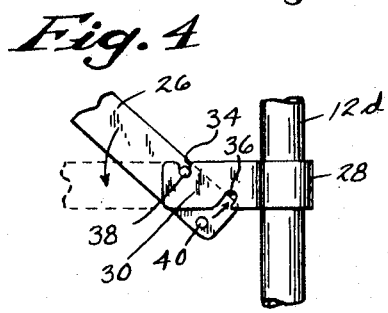
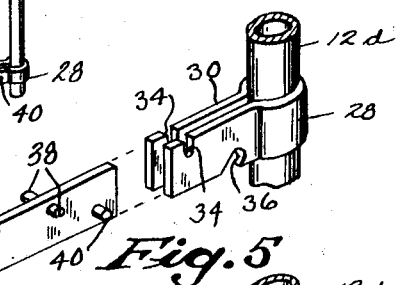
INVENTOR
HENRY P. GLASS
BY *Robert H Jacob*
AGT.

July 15, 1969  H. P. GLASS  3,455,291
FIREPLACE HAVING ADJUSTABLE FOOD RECEPTACLE AND ASH RECEPTACLE
Filed May 10, 1967  2 Sheets-Sheet 2
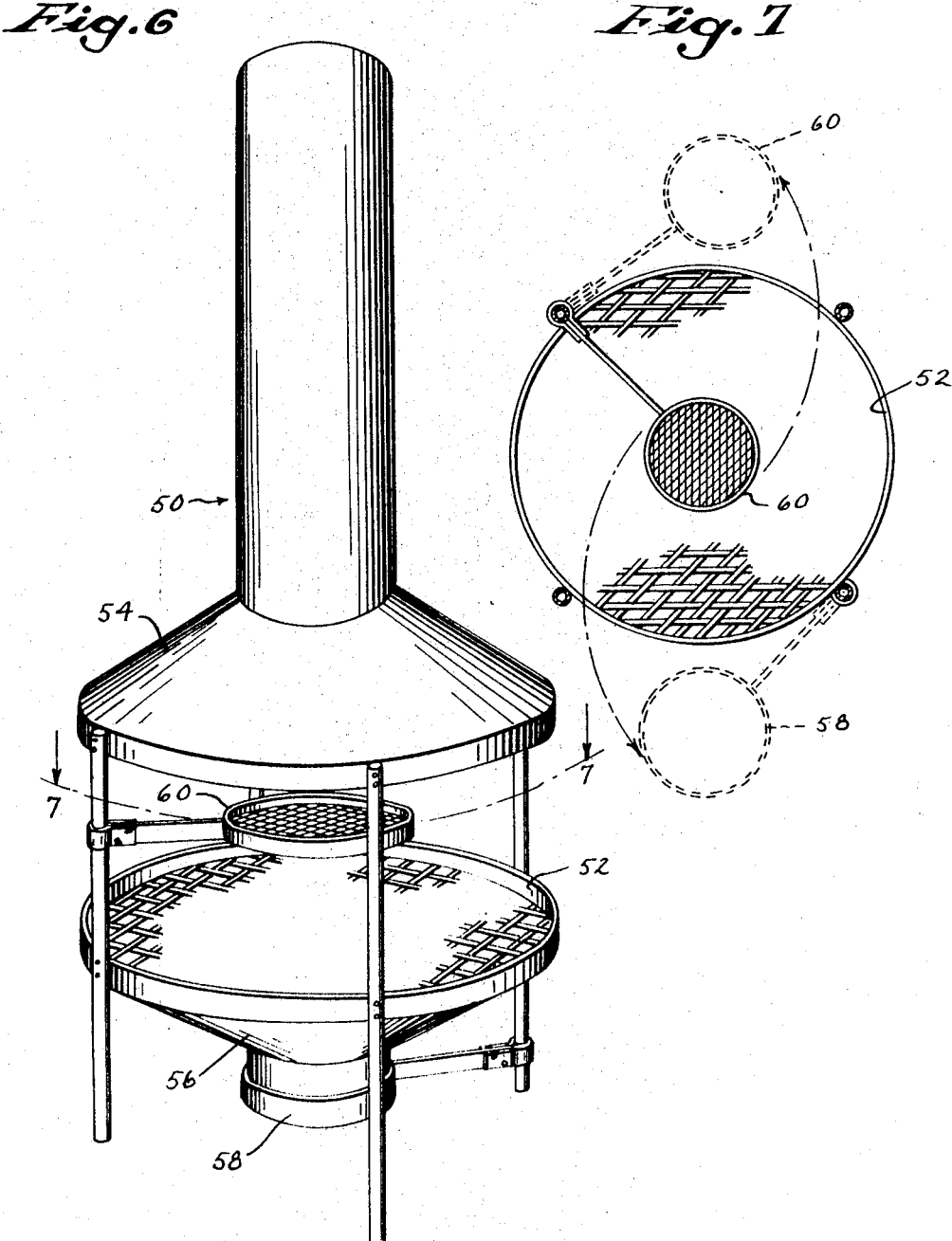
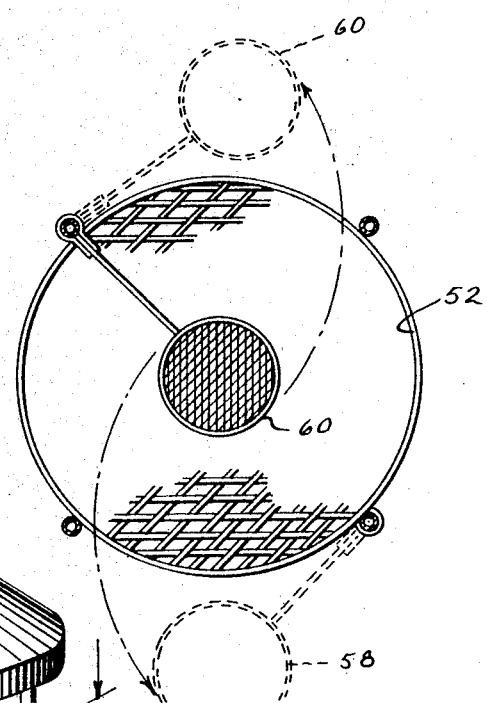
INVENTOR
HENRY P. GLASS
BY *Robert H. Jacob*
AGT.

United States Patent Office 3,455,291
Patented July 15, 1969

3,455,291
FIREPLACE HAVING ADJUSTABLE FOOD
RECEPTACLE AND ASH RECEPTACLE
Henry P. Glass, Chicago, Ill., assignor to Welded
Products Company, Grand Haven, Mich., a corporation of Michigan
Filed May 10, 1967, Ser. No. 637,583
Int. Cl. F24b 1/26, 3/00; A47j 37/00
U.S. Cl. 126—137
9 Claims

ABSTRACT OF THE DISCLOSURE

A fireplace comprises vertical support columns on which a perforated fuel receptacle or grate is mounted. An ash receptacle is located beneath the grate and is pivotally mounted on one of the support columns so it can be swung beneath the grate to catch falling ashes and swung out from beneath the grate for cleaning. A food receptacle or grill is located above the grate and is pivotally mounted on another of the support columns so it can be swung over the grate for cooking purposes and swung clear of the grate. Both the ash receptacle and food receptacle are supported on holders which connect to sleeves which are pivotably as well as vertically adjustable on their respective columns. Ash guiding means are located between the grate and ash receptacle and a hood is located above the food receptacle.

Summary of the invention

This invention relates generally to fireplaces and particularly to those having food receptacles and ash receptacles which are adjustable.

It is desirable to provide an improved type of fireplace which is especially adapted for indoor use, which is adapated to permit food to be conveneently cooked thereon, which is also adapted to permit ashes from the fuel used to be easily removed therefrom, which can be easily disassembled for cleaning, and which can be assembled in a variety of ways in order to suit its physical location.

Objects of the invention

It is an object of the present invention to provide fireplaces of the aforesaid character.

It is an object to provide fireplaces of the aforesaid character which have adjustable food receptacles and ash receptacles which facilitate the cooking of food and cleaning of the fireplace.

Another object is to provide fireplaces of the aforesaid character wherein the food and ash receptacles can be arranged in a variety of ways to suit the location of the fireplace.

Another object is to provide a fireplace of the aforesaid character which is relatively simple and economical to fabricate and which has a handsome appearance.

Another object is to provide improved means for mounting food grills and ash receptacles on fireplaces.

Other objects and advantages of the invention will hereinafter appear.

Description of the drawings

The accompanying drawings illustrate two preferred embodiments of the invention but it is to be understood that the embodiments illustrated are susceptible of modifications with respect to details thereof without departing from the scope of the appended claims.

In the drawings:

FIG. 1 is a perspective view of one type of fireplace in which the present invention is embodied;

FIG. 2 is a view of the fireplace taken along the line 2—2 in FIG. 1;

FIG. 3 is an enlarged perspective view of a portion of receptacle holding means according to the invention;

FIG. 4 is a side elevatioial view of the holding means shown in FIG. 3;

FIG. 5 is an enlarged perspective view of another receptacle holding means according to the invention;

FIG. 6 is a perspective view of another type of fireplace in which the present invention is embodied; and FIG. 7 is a view of the fireplace taken along the line 7—7 in FIG. 6.

Description of the invention

Referring to FIG. 1 of the drawing, the numeral 10 designates a fireplace embodying the present invention. Fireplace 10 comprises supporting means which take the form of a plurality of vertical columns or poles 12a, 12b, 12c and 12d, a fuel holding means, such as a grate 14 with apertures 16 therein, mounted on the supporting means. Grate 14 is adapted, for example, to hold combustible materials used in cooking, such as charcoal or wood. The apertures 16 in grate 14 permit ashes to fall therethrough.

A hood 18 with a chimney 20 attached is mounted on the supporting means above grate 14 to catch smoke, fumes and flames.

Ash guiding means in the form of a funnel shaped member 22 which is open at both ends is located below grate 14 and shown as being supported thereby. However, member 22 could be mounted directly on the supporting means.

Ash receptacle means in the form of a rectangular pan 24 having a holder 26 is located below member 22. Holder 26 is removably mountable on a sleeve 28 which is disposed, for example, on column 12a. It is to be understood that sleeve, which is best seen in FIGS. 3 and 4, is slidable vertically on column 12a and is also pivotable with respect thereto. In the embodiment shown sleeve 28 is key-hole shaped and has two arms 30 and 32 which are provided with upper slots 34 and lower slots 36. The slots 34 and 36 in sleeve 28 are adapted to engage with pin members or projections 38 and 40, respectively, mounted on holder 26 for pan 24 of the ash receptacle means, as FIG. 4 shows.

When holder 26 for pan 24 engages sleeves 28, the downward force exerted on the sleeve causes the latter to window-lock on the column with which it is associated. As a consequence, sleeve 28 does not tend to slide down its column. This same binding force tends to resist accidental or random pivoting of sleeve 28 around its column. However, sleeve 28 can be vertically and pivotably adjusted on its column merely by exerting a slight upward force on holder 26 so as to relieve the window-locking effect of the sleeve on its column.

FIG. 5 shows an enlarged perspective view of a receptacle holder 26a which is adapated to engage with a sleeve 28a. Holder 26a and sleeve 28a could be used instead of holder 26 and sleeve 28, respectively. Sleeve 28a comprises a tang 28b having a hole 28c therein into which holder 26a extends. Sleeve 28a is pivotable and vertically movable on its associated column and locks in place thereon in the same manner as sleeve 28 hereinbefore described.

Food receptacle means in the form of a rectangular perforated grill 42 having a holder 44 is located above grate 14. Holder 44, which is understood to be similar to holder 26 hereinbefore described, is removably mountable on a sleeve 46 which is disposed, for example, on column 12b. It is to be understood that sleeve 46 is similar to sleeve 28 hereinbefore described and operates in a similar manner to allow for vertical adjustment and pivoting of grill 42.

Fireplace 10 is employed in the following manner. Fuel on grate 14 heats food disposed on grill 42. Grill 42 can be swung outwardly from fireplace 10, as FIG. 2 shows, so that food can be conveniently placed thereon or removed. Grill 42 can be raised or lowered to a suitable distance above grate 14 as desired by exerting upward force on holder 44 so as to relieve the window-locking action on sleeve 46. Ashes from the fuel on grate 14 fall through the perforations 16 and are guided by member 22 into pan 24. Pan 24 can be swung outwardly from fireplace 10, as FIG. 2 shows, so that ashes can be conveniently removed therefrom. Pan 24 can also be vertically moved downwardly with respect to member 22 to obtain the necessary clearance for ashes which may pile up on the pan. Furthermore, pan 24 can be moved with respect to the bottom opening in member 22 to regulate the draft beneath grate 14. Both receptacles 24 and 42 can be detached from fireplace 10 for cleaning merely by disengaging the holders 26 and 44 from their respective sleeves 28 and 46. While FIGS. 1 and 2 show the columns 12b and 12d used to support the receptacles 42 and 24, respectively it is apparent that other columns could be selected or that only one column could be employed to support both receptacles.

Referring to FIGS. 5 and 6, the numeral 50 designates another embodiment of a fireplace in accordance with the present invention. Fireplace 50 is similar to fireplace 10 hereinbefore described except that in fireplace 50 the grate 52, the hood 54, the ash guiding member 56, the ash receptacle 58 and the food receptacle 60 are circular rather than rectangular in form.

It will be apparent that, while only one food receptacle is shown in each embodiment of the invention, more than one such receptacle could be employed and they could be mounted on the same or different columns.

I claim:
1. In a fireplace:
   supporting means comprising at least one vertical column,
   a food receptacle pivotally mounted on said column,
   a fuel receptacle rigidly mounted on said column below said food receptacle,
   an ash guiding means rigidly mounted on said column below said fuel receptacle,
   and an ash receptacle pivotably mounted on said column below said ash guiding means.
2. A fireplace according to claim 1 wherein said food receptacle is vertically movable with respect to said column.
3. A fireplace according to claim 2 wherein said ash receptacle is vertically movable with respect to said column.
4. A fireplace according to claim 3 including a hood mounted above said fuel receptacle and said food receptacle when the latter is in position above said fuel receptacle.
5. A fireplace according to claim 1 including attachment means for mounting said food receptacle and said ash receptacle means on said supporting means so as to be vertically adjustable.
6. A fireplace according to claim 5 wherein said supporting means comprises a plurality of vertical columns and wherein said food receptacle and said ash receptacle are mounted on different vertical columns by said attachment means.
7. A fireplace according to claim 5 wherein said attachment means comprises a holder connected to a receptacle and a sleeve pivotably and slidably mounted on a column, said holder being releasably connectable to said sleeve thereby immobilizing said sleeve on said column.
8. A fireplace according to claim 7 wherein at least one sleeve comprises a pair of spaced apart arms between which arms said holder is adapted to extend and which arms are each provided with upper and lower slots for engagement with a pair of projections on said holder.
9. A fireplace according to claim 7 wherein at least one sleeve comprises a tang having a hole therein for receiving the end of said holder.

References Cited
UNITED STATES PATENTS

| | | |
|---|---|---|
| 1,414,771 | 5/1922 | Cantleberry. |
| 2,530,166 | 11/1950 | Johannsen _____ 126—25 |
| 2,960,979 | 11/1960 | Stone _____ 126—30 X |
| 3,094,113 | 6/1963 | Avila _____ 126—30 |
| 3,220,400 | 11/1965 | Yager _____ 126—25 X |

CHARLES J. MYHRE, Primary Examiner

U.S. Cl X.R.

126—25, 30